UNITED STATES PATENT OFFICE.

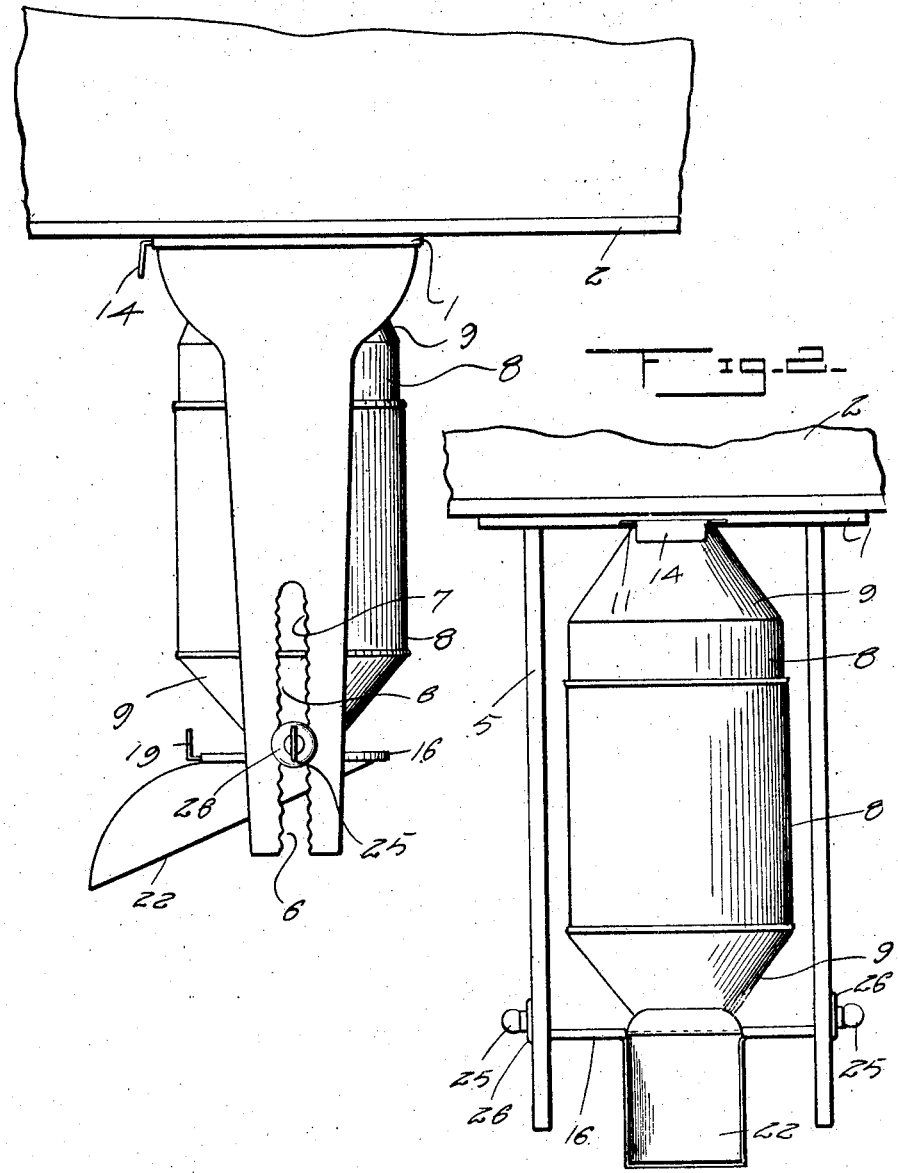

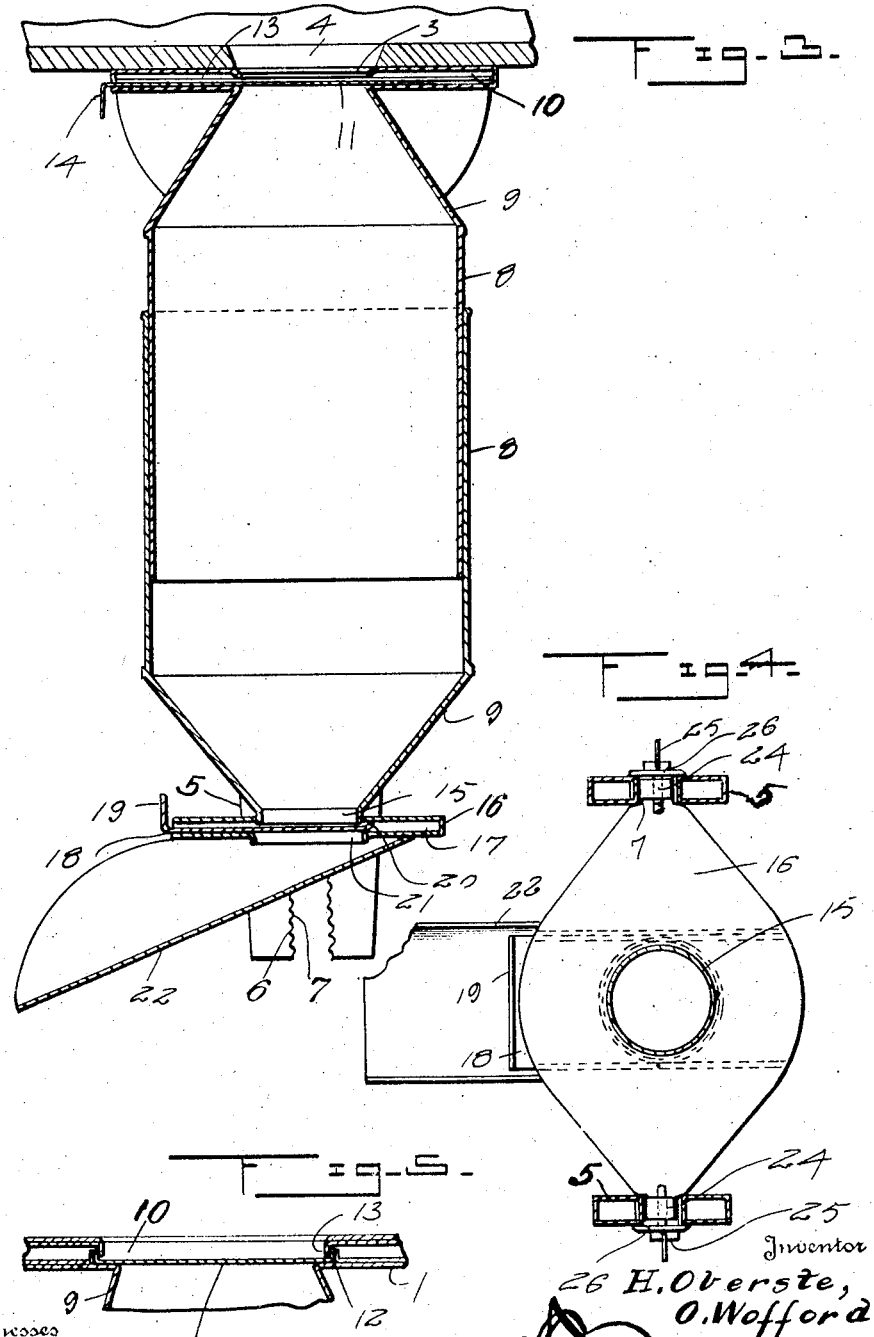

HUGO OBERSTE AND ORMAND WOFFORD, OF HARTMAN, ARKANSAS.

MEASURING-FUNNEL.

1,329,472.      Specification of Letters Patent.     Patented Feb. 3, 1920.

Application filed May 23, 1917. Serial No. 170,534.

*To all whom it may concern:*

Be it known that we, (1) HUGO OBERSTE and (2) ORMAND WOFFORD, citizens of the United States, residing at Hartman, in the county of Johnson and State of Arkansas, have invented certain new and useful Improvements in Measuring-Funnels; and we do hereby declare the following to be a full, clear, and exact description of the invention, such as will enable others skilled in the art to which it appertains to make and use the same.

This invention relates to a measuring device and more particularly to an attachment to be applied to a bin or the like for measuring the contents of the bin as it is dispensed therefrom.

Another object of the invention is the provision of an adjustable measuring receptacle associated with the bin for the purpose of receiving the contents of the bin so as to measure the same as it is dispensed.

A further object of this invention is the provision of a supporting structure secured to the bin and having means for adjustably supporting the measuring receptacle whereby the measuring receptacle can be adjusted for measuring various quantities of the contents of the bin.

A further object of this invention is the provision of means located at each end of the measuring receptacle for cutting off and on the inflow and outflow of the contents from the bin through the measuring receptacle.

A still further object of this invention is the provision of a measuring funnel of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawings, in which:

Figure 1 is a side elevation of a measuring device constructed in accordance with our invention, Fig. 2 is a front elevation of the same, Fig. 3 is a vertical sectional view illustrating the means for cutting off and on the inlet and outlet supply from the bin to the measuring receptacle, Fig. 4 is a longitudinal sectional view illustrating the inlet port to the measuring receptacle, Fig. 5 is a detail sectional view of the means for securing the cut off slide to the measuring receptacle.

Referring in detail to the drawings, the numeral 1 indicates an attaching plate which is secured to the bin 2 in any suitable manner. The plate 1 is provided with an opening 3 that registers with an opening 4 in the bin 2 so as to permit the contents of the bin to pass outwardly from the bin. A pair of relatively spaced and downwardly depending supporting arms 5 are formed upon the plate 1 and have their lower ends bifurcated as shown at 6, the walls of which are serrated as at 7.

A measuring receptacle 8 of cylindrical formation is provided with its upper and lower ends of conical formation as shown at 9. The receptacle 8 consists of telescopic sections as clearly shown in Figs. 1, 2 and 3. The upper conical end 9 of the upper section of the measuring receptacle 8 is formed upon the plate 1 and has its apex open, and in registration with the opening 3 of the plate. The plate 1 is provided with a longitudinally extending slot 10, in which is slidably mounted, a cut off slide 11, which has its edges bent upwardly to form retaining flanges 12. The retaining flanges 12 are adapted to engage the downwardly depending flanges 13 formed upon the opening 3 of the plate 1. One end of the cut off plate 11 is provided with a finger grip 14, whereby said cut off plate may be slid within the slot 10, to open and close the opening 3 to the measuring receptacle 8. The opposite end of the cut off plate 11 is provided with an upturned flange, for the purpose of limiting the outward movement of said plate.

The lower section of the measuring receptacle 8 has its apex opened as at 15 and secured to an adjusting plate 16, which is provided with a slot 17 to slidably receive a cut off plate 18. The cut off plate 18 is identical in construction with the cut off plate 11 having the finger 19 and the stop or limiting flange 20. The adjusting plate 16 is provided with an opening 21 in registration with the opening 15, and has disposed thereunder a chute 22 for receiving the contents of the measuring receptacle when it is dispensed therefrom by opening the cut off plate 18.

The adjusting plate 16 has its oppositely disposed sides reduced to form lugs 24, which are adapted to be disposed within the bifurcated portions 6 of the supporting members 5. Set screws 25 are threaded within the lugs 24 and have heads 26 formed thereon adapted to engage the outer faces of the supporting members 5 for supporting the adjusting plate 16 at various adjusted positions. The lugs 24 are held against accidental movement by the serrations 7. It will therefore be noted that the lower section of the measuring receptacle is carried by the adjusting plate 16 and by adjusting the same within the supporting members 5, the measurements of the measuring receptacle may readily be varied.

In operation, the opening 21 is closed by the cut off plate 18 and the openings 3 and 4 are opened by pulling outwardly upon the cut off plate 10, so that the contents within the bin may pass into the measuring receptacle. As the measuring receptacle becomes filled, the cut off plate 11 is slid within the slot 10 to close the openings 3 and 4. A bag or the like is then placed at the mouth of the chute 22 and the openings 21 and 15 are opened by pulling outwardly upon the plate 18 permitting the contents within the measuring receptacle to pass into the bag or the like. It can be therefore seen that the measuring receptacle 8 may be readily adjusted for measuring various quantities as desired and which will remain set at any adjusted position, thus obviating the necessity of weighing each bag or carton filled by the device.

While we have shown and described the preferred embodiment of our invention, it will be understood that minor changes in construction, combination and arrangement of parts may be made without departing from the spirit and scope of the invention as claimed.

Having thus described our invention, what we claim is:

A measuring device comprising an adjustable measuring receptacle having conical open ends, hollow members secured to the apexes of the receptacle and having openings therein alining with the openings formed by the open ends of said receptacle, flanges formed about the openings of said hollow members, one of said hollow members secured to a bin and having the openings thereof in registration with the outlet port of said bin, downwardly depending arms formed on the last named hollow member, means adjustably securing the receptacle to the lower ends of said arms, and controlling elements slidable in said hollow members and having their edges angularly related to engage the flanges.

In testimony whereof we affix our signatures in presence of two witnesses.

HUGO OBERSTE.
ORMAND WOFFORD.

Witnesses:
 JOE M. SENSEKER,
 H. W. OBERSTE.